Patented Feb. 1, 1949

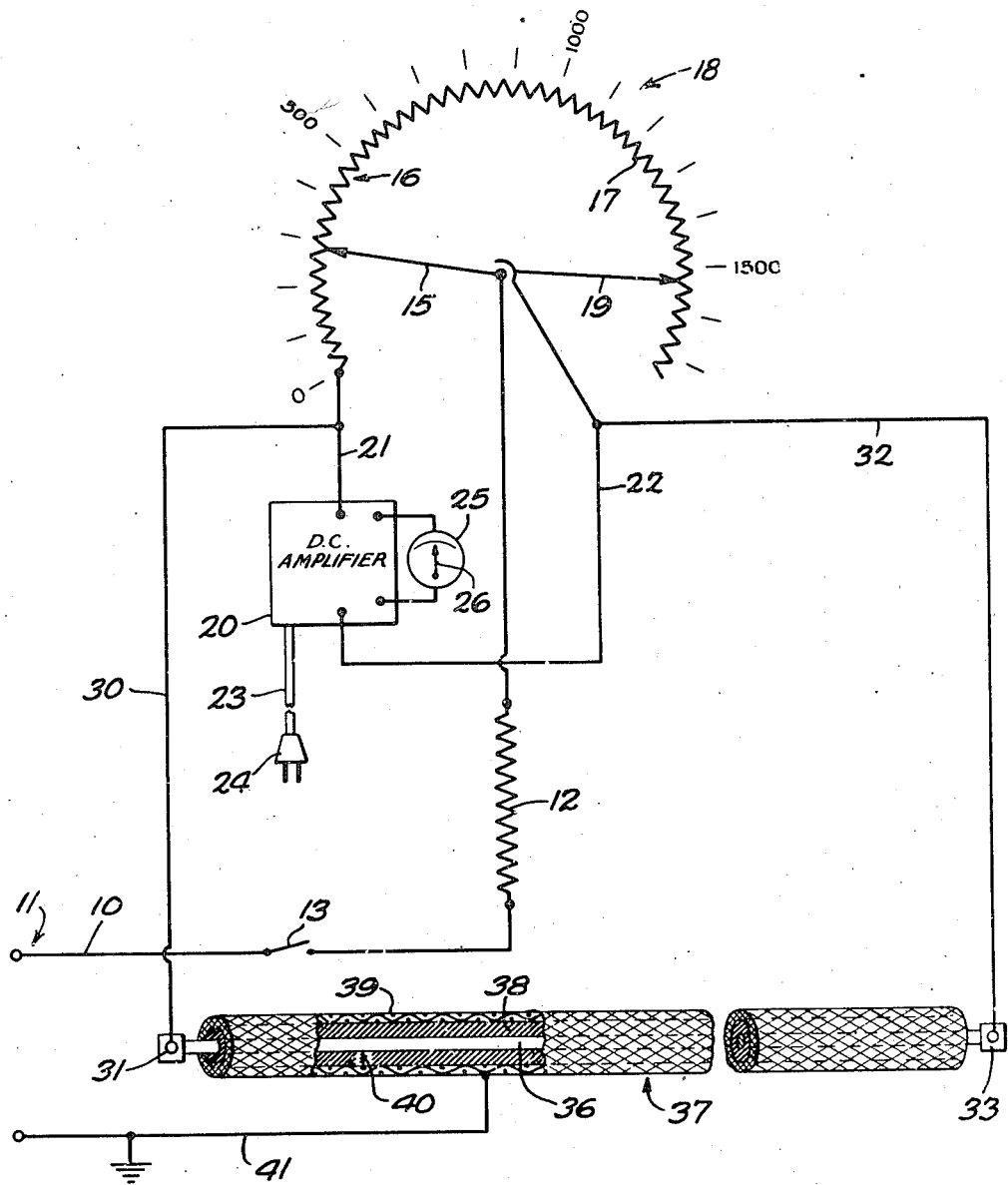

2,460,688

UNITED STATES PATENT OFFICE 2,460,688

APPARATUS FOR LOCATING FAULTS IN CABLES

Richard D. Gambrill and Clay E. Lewis, Baltimore, Md., assignors to Western Electric Company, Incorporated, New York, N. Y., a corporation of New York Application May 4, 1944, Serial No. 534,094

2 Claims. (Cl. 175—183)

This invention relates to methods of and apparatus for locating faults, and particularly to methods of and apparatus for locating faults in the insulating jackets of insulated conductors.

An object of the invention is the provision of new and improved methods of and apparatus for locating faults, particularly in the insulating jackets of insulated conductors.

One apparatus embodying the invention comprises a calibrated potentiometer, means for connecting a conductor of a faulty cable in a circuit with the potentiometer so that the potentiometer and the faulty cable form the arms of a Wheatstone bridge, means for impressing a high D. C. voltage upon the bridge, means for limiting the current flowing through the circuit, and a detecting circuit across the bridge including a high sensitivity D. C. meter and a D. C. amplifying and protecting device.

A complete understanding of the invention may be obtained from the following detailed description of a specific embodiment thereof, when read in conjunction with the appended drawing, in which the single figure is a schematic view of an apparatus constituting one embodiment of the invention.

Referring more specifically to the drawing, a conductor 10 of a power line 11 leading from a source of a high D. C. potential (not shown) is connected to one end of a resistor 12. The conductor 10 has a normally open switch 13 therein. An adjustable contactor 15 of a potentiometer 16 is connected to the other end of the resistor 12.

The potentiometer 16 also includes a resistance 17, a scale 18 calibrated in feet of cable and extending along the resistance 17 with the zero end of the scale adjacent to the left end of the resistance, as viewed in the drawing, and a second adjustable contactor 19. The contactors 15 and 19 are selectively and individually adjustable with respect to the resistance 17 and the relative positions of the contactors may be obtained by noting their positions opposite the calibrated scale 18.

A D. C. amplifier 20 is connected to the zero end of the resistance 17 by a conductor 21 and to the contactor 19 by a conductor 22. A sensitive D. C. milliammeter 25 having a pointer 26 is connected to the output terminals of the amplifier 20. The amplifier 20 is one of a type of amplifiers well known to those skilled in the art of electrical testing and serves both to amplify a low potential between the conductors 21 and 22 and to limit the effect upon the milliammeter 25 of a high potential between those conductors which would damage the milliammeter if it were connected directly to the conductors 21 and 22. This is due to the fact that the amplifier 20 may be considered as operating in this instance as a well known vacuum tube voltmeter, having an inherent amplification factor which causes the amplifier to saturate at a point below the value of current which will damage a milliammeter connected to its output circuit. The adjustment and operation of such a vacuum tube voltmeter is fully described on pages 111, 112, 134 and 135 of the book, "Vacuum Tube Voltmeters," published by J. F. Rider, Inc., New York city, 1941. The D. C. amplifier designated "Type 715 A" manufactured by General Radio Company of Cambridge, Mass., is an amplifier that may be used as the amplifier 20.

A cord 23 and a plug 24 serve to connect the amplifier 20 with a source of power, and, when there is no difference in potential between the conductor 21 and the conductor 22, the pointer 26 is maintained by the amplifier 20 in the mid-scale position, as shown in the drawing. However, when a potential impressed upon the conductor 22 is higher than that impressed upon the conductor 21, the difference in potential affects the amplifier so that less current flows through the milliammeter 25 and the pointer 26 is deflected to the left, as viewed in the drawing, to indicate that fact. Conversely, if a higher potential is impressed upon the conductor 21 than is impressed upon the conductor 22, the amplifier is affected so as to cause more current to flow through the milliammeter 25 and the pointer 26 is deflected to the right of the vertical position, to indicate the difference in potential between the conductors 21 and 22.

A conductor 30 connects the conductor 21 to a connector 31 and a conductor 32 connects the conductor 22 to a connector 33. The connectors 31 and 33 serve to secure detachably the ends of a conductor 36 to the conductors 30 and 32, whereby the right hand end of the conductor 36, as viewed in the drawing, is connected to the contactor 19 and the left hand end of the conductor 36 is connected to the zero end of the resistance 17. The conductor 36 forms a part of a cable 37, which includes an insulating jacket 38 surrounding the conductor 36 and a braided metallic sheath 39 surrounding the jacket 38. The jacket 38 has a high resistance fault 40 therein, the presence of which has been previously determined, but the location of which along the length of the cable 37 has not been ascertained. A grounded conductor 41 is connected to the metallic sheath 39, which is in contact with the fault 40.

In the operation of the apparatus described hereinabove, the ends of the conductor 36 are connected to the connectors 31 and 33, as shown in the drawing, and the contactor 19 is adjusted with respect to the resistance 17 until the contactor 19 is opposite a mark on the scale indicating the total length in feet of the cable 37.

The switch 13 is then closed whereby a high, direct current potential is applied to the contactor 15, whereupon current flows through the portions of the resistance 17 on both sides of the contactor 15. The above mentioned portions of the resistance 17 form two arms of a Wheatstone bridge circuit, which includes the portions of the conductor 36 to the left and to the right of the fault 40, as viewed in the drawing. Current flows through the conductors 71 and 30 and the portion of the conductor 36 to the left of the fault 40 to the fault. Then the high potential overcomes the resistance of the fault and current flows through the fault to the sheath 39 and to ground. Current also flows through the contactor 19, the conductors 22 and 32, and the portion of the conductor to the right of the fault 40 to the fault and then through the fault to the sheath 39 and to ground. The great difference in potential between the conductor 36 and the sheath 39, which is grounded by the conductor 41, causes current to flow through the fault 40 to the grounded sheath 39. The potential applied to the bridge circuit must be sufficiently high to cause current of appreciable magnitude to flow through the fault 40. To test faults of very high resistances, potentials of about 2000 volts are supplied to the bridge circuit by the conductor 10.

If there is any difference in potential between the conductors 21 and 22, this difference in potential affects the amplifier 20 and the pointer 26 of the milliammeter 25 indicates this unbalance in the bridge circuit. The contactor 15 is then adjusted until the bridge circuit is in balance, which fact is indicated by the pointer 26, which assumes the mid-scale position shown in the drawing, and at this time the contactor 15 indicates on the calibrated scale 18 the distance in feet from the left end of the cable 37 to the fault 40.

The switch 13 is then opened and the cable 37 is removed from the apparatus and the location of the fault 40 is marked thereon. Another cable similar to the cable 37 then may be placed in the apparatus and the operation described hereinabove may be repeated to locate a fault therein.

The apparatus described hereinabove serves to locate faults of high resistances rapidly and accurately. The sensitive milliammeter 25 serves to indicate even a slight unbalance in the bridge circuit so that the bridge circuit may be balanced within very close limits. By applying a high potential to an end of a high resistance fault and grounding the other end of the fault, as described hereinabove, the resistance of the fault may be overcome and the location thereof speedily determined.

What is claimed is:

1. In an apparatus for testing for and locating high resistance faults in the insulating jackets of insulated cables including a calibrated potentiometer connected across the ends of the conductor of such a cable, means for impressing a high D. C. potential across the balancing arm of the potentiometer and the insulating jacket of the cable to break down the insulation at a fault therein and divide the cable at the fault so as to form a Wheatstone bridge circuit with the potentiometer, and balance indicating means comprising a D. C. vacuum tube amplifier and a milliammeter, said bridge circuit being connected to the input circuit of the D. C. amplifier and said milliammeter being connected to the output circuit of said amplifier, whereby when the bridge circuit is formed through the breakdown of a high resistance fault in the insulation, any large currents produced therein will pass through the amplifier only and will affect the milliammeter only as permitted by the amplifier.

2. In an apparatus for testing for and locating a high resistance fault in the insulation surrounding a conductor forming a part of an electric cable including a calibrated potentiometer connected across the ends of the conductor, means for impressing a high D. C. potential across the balancing arm of the potentiometer and the insulation to break down a fault in the insulation thereby dividing the cable at the fault to form a Wheatstone bridge circuit with the potentiometer, and means for indicating when the bridge is balanced comprising a D. C. vacuum tube amplifier having its input circuit connected across the bridge circuit and a sensitive milliammeter connected to the output circuit of the D. C. amplifier, said amplifier serving to protect the sensitive milliammeter from high currents present in the bridge circuit before a balance is obtained and to amplify a very low current in the bridge circuit to facilitate obtaining an exact balance of the bridge circuit.

RICHARD D. GAMBRILL.
CLAY E. LEWIS.

REFERENCES CITED

The following references are of record in the file of this patent:

UNITED STATES PATENTS

| Number | Name | Date |
|---|---|---|
| 754,402 | Wiseman | Mar. 8, 1904 |
| 1,665,397 | Wunsch | Apr. 10, 1928 |
| 1,958,361 | Estes et al. | May 8, 1934 |
| 2,176,759 | Borden | Oct. 17, 1939 |

OTHER REFERENCES

Rider: Vacuum Tube Voltmeters, John F. Rider Publisher, Inc., New York city; 1941, pages 11, 112, 134 and 135.